United States Patent
Rullier

(10) Patent No.: US 12,518,011 B2
(45) Date of Patent: Jan. 6, 2026

(54) TECHNIQUES FOR REMEDIATING CONTROL FLOW FLATTENING

(71) Applicant: CrowdStrike, Inc., Sunnyvale, CA (US)

(72) Inventor: Anthony Rullier, Paris (FR)

(73) Assignee: CrowdStrike, Inc., Sunnyvale, CA (US)

( * ) Notice: Subject to any disclaimer, the term of this patent is extended or adjusted under 35 U.S.C. 154(b) by 361 days.

(21) Appl. No.: 18/186,532

(22) Filed: Mar. 20, 2023

(65) Prior Publication Data

US 2024/0320334 A1   Sep. 26, 2024

(51) Int. Cl.
G06F 21/56   (2013.01)
G06F 21/52   (2013.01)

(52) U.S. Cl.
CPC ............ G06F 21/566 (2013.01); G06F 21/52 (2013.01); *G06F 2221/033* (2013.01)

(58) Field of Classification Search
CPC ... G06F 21/566; G06F 21/52; G06F 2221/033
USPC .......................................................... 726/23
See application file for complete search history.

(56) References Cited

U.S. PATENT DOCUMENTS

| | | | | |
|---|---|---|---|---|
| 5,872,946 A * | 2/1999 | Narayan | ................... | G06F 9/382 712/E9.055 |
| 6,141,745 A * | 10/2000 | Pickett | ................ | G06F 9/30152 712/213 |
| 6,668,325 B1 * | 12/2003 | Collberg | ................. | G06F 21/14 726/26 |
| 7,287,166 B1 * | 10/2007 | Chang | ..................... | G06F 21/54 713/176 |
| 7,904,642 B1 * | 3/2011 | Gupta | ............... | G06F 16/90339 711/108 |
| 9,904,526 B2 * | 2/2018 | Salmon-Legagneur | ..................... | G06F 8/443 |
| 11,210,135 B2 * | 12/2021 | Johansson | ............. | G06F 9/4881 |
| 11,902,306 B1 * | 2/2024 | Satish | ................. | H04L 63/1425 |
| 11,973,780 B2 * | 4/2024 | Melicher | ............. | H04L 63/0263 |
| 12,223,044 B1 * | 2/2025 | Jung | ..................... | G06F 21/564 |

(Continued)

FOREIGN PATENT DOCUMENTS

KR   20220037721 A   *   3/2022

OTHER PUBLICATIONS

Babak Yadegari; A Generic Approach to Automatic Deobfuscation of Executable Code; IEEE:2015; pp. 674-691.*

*Primary Examiner* — Monjur Rahim
(74) *Attorney, Agent, or Firm* — Womble Bond Dickinson (US) LLP

(57) ABSTRACT

A computer-implemented method for deobfuscating an executable image including a plurality of computer instructions organized in a first control flow is provided. The computer-implemented method includes analyzing the executable image to identify a plurality of discrete blocks of the computer instructions, the computer instructions of each of the discrete blocks comprising a control flow transfer instruction and a dispatcher variable, categorizing a type of each of the discrete blocks into one of a plurality of block types, wherein the plurality of block types comprise a conditional functional block type, an unconditional functional block type, and a dispatcher block type, based on the type of each of the discrete blocks, reorganizing the computer instructions of the executable image into a second control flow, different from the first control flow.

17 Claims, 6 Drawing Sheets

(56) References Cited

U.S. PATENT DOCUMENTS

| | | | |
|---|---|---|---|
| 2005/0183072 A1* | 8/2005 | Horning | G06F 21/10 |
| | | | 717/140 |
| 2006/0031686 A1* | 2/2006 | Atallah | G06F 12/1408 |
| | | | 711/E12.092 |
| 2006/0130016 A1* | 6/2006 | Wagner | G06F 9/54 |
| | | | 717/136 |
| 2007/0112969 A1* | 5/2007 | Wang | H04L 43/18 |
| | | | 709/230 |
| 2014/0082329 A1* | 3/2014 | Ghose | G06F 9/3877 |
| | | | 712/208 |
| 2015/0310193 A1* | 10/2015 | Hoogerbrugge | G06F 21/14 |
| | | | 726/26 |
| 2016/0378483 A1* | 12/2016 | Burger | G06F 9/381 |
| | | | 712/200 |
| 2017/0083314 A1* | 3/2017 | Burger | G06F 9/3004 |
| 2017/0083334 A1* | 3/2017 | Burger | G06F 9/30047 |
| 2017/0083341 A1* | 3/2017 | Burger | G06F 11/3648 |
| 2019/0228137 A1* | 7/2019 | Johansson | G06F 21/602 |
| 2020/0053109 A1* | 2/2020 | Lancioni | H04L 63/1425 |
| 2020/0151007 A1* | 5/2020 | Johansson | G06F 21/14 |
| 2021/0012017 A1* | 1/2021 | Wu | G06F 21/6281 |
| 2022/0116411 A1* | 4/2022 | Melicher | G06F 21/566 |
| 2023/0133651 A1* | 5/2023 | Wildsmith | G06F 21/563 |
| | | | 726/24 |
| 2023/0140432 A1* | 5/2023 | Wildsmith | G06F 21/14 |
| | | | 726/22 |
| 2023/0169178 A1* | 6/2023 | Pande | G06F 21/64 |
| | | | 726/22 |

* cited by examiner

TECHNIQUES FOR REMEDIATING CONTROL FLOW FLATTENING

TECHNICAL FIELD

Aspects of the present disclosure relate to detecting malicious executables, and more particularly, to detecting malicious executables whose control flow has been obfuscated.

BACKGROUND

Malware is a term that refers to malicious software. Malware includes software that is designed with malicious intent to cause intentional harm and/or bypass security measures. Malware is used, for example, by cyber attackers to disrupt computer operations, to access and to steal sensitive information stored on the computer or provided to the computer by a user, or to perform other actions that are harmful to the computer and/or to the user of the computer. Malware may be formatted as executable files (e.g., COM or EXE files), dynamic link libraries (DLLs), scripts, steganographic encodings within media files such as images, and/or other types of computer programs, or combinations thereof. Malware authors or distributors frequently disguise or obfuscate malware in attempts to evade detection by malware-detection or -removal tools.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
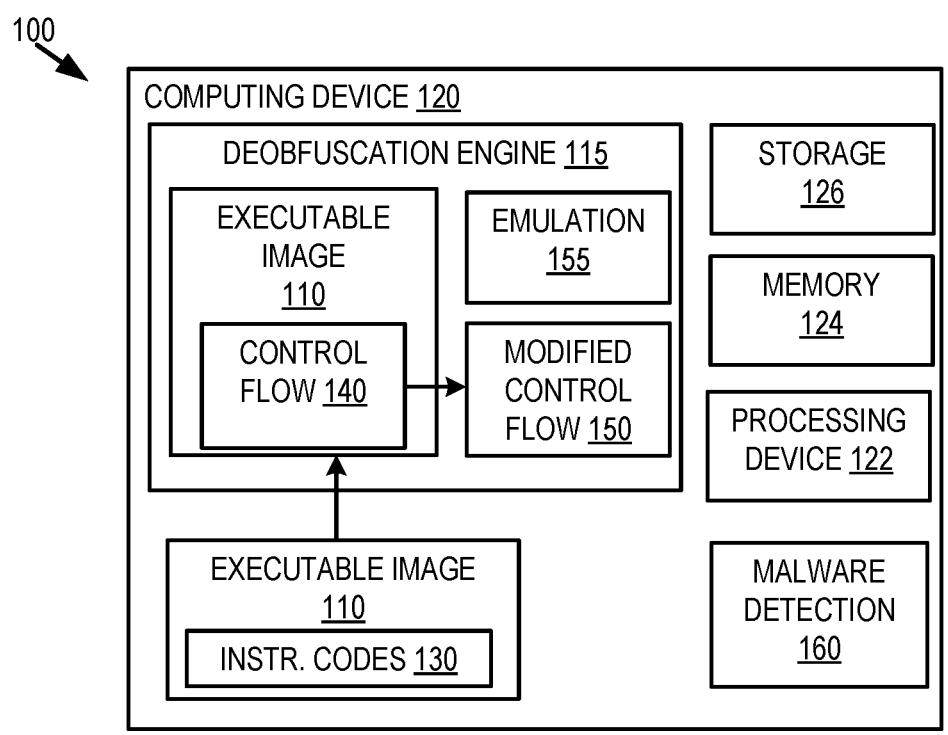
FIG. 1 is a block diagram that illustrates an example system for emulating executable programs and/or detecting malware, according to some embodiments of the present disclosure.

Modern computer systems are subject to a large number of potential malware attacks. Examples of malware include computer viruses, worms, Trojan horses, ransomware, rootkits, keyloggers, spyware, adware, rogue security software, potentially unwanted programs (PUPs), potentially unwanted applications (PUAs), and other malicious programs. To protect from such malware, users may install scanning programs which attempt to detect the presence of malware. These scanning programs may review programs and/or executables that exist on the computer's storage medium (e.g., a hard disk drive (HDD)) prior to execution of the file. However, authors and distributors of malware have taken countermeasures to avoid these scanning programs. In some cases, the malware is obfuscated to conceal the contents of the file. Obfuscation may include varying the contents of the file to misdirect, confuse, or otherwise conceal the true purpose and/or function of the code. For example, obfuscation may include inserting inoperable code within the executable instructions, compressing/encrypting the operating instructions, rearranging the code instructions, and/or other techniques.

One example of an obfuscation technique includes control flow flattening. Control flow flattening is used to make the control flow of an executable program more difficult to understand, with the goal of concealing the true operation of the executable program from analysis. Control flow flattening may transform the control flow of the executable program into a sequence of instructions that masks the true order that operations of the executable program are executed. For example, a control flow flattening obfuscation operation may introduce additional conditional statements and loops in the code that make it harder to determine the actual order of execution of the code. This makes it more difficult to analyze the executable program and figure out how it works, which may make the detection of malware more difficult.

When control flow flattening is in use, applications that analyze executable programs may have difficulty in identifying malware. In some cases, such applications may have difficulty in recognizing the malware because they are unable to identify the types of operations being performed and/or because they are unable to compare a flow of the operations to known malware. For example, malware may utilize control flow flattening to mask known attack signatures and/or operations from analysis. In addition, control flow flattening may defeat traditional techniques used to identify similarities between malware variants and changes made to malware, such as binary diffing.

The present disclosure addresses the above-noted and other deficiencies by providing an application that is capable of identifying the presence of control flow flattening and generating a representation of a non-obfuscated flow of the operations. In some embodiments, an executable application that has undergone control flow flattening may be analyzed to categorize discrete blocks of computer instructions of the executable program into particular categories. In some embodiments, some categories of the blocks may include dispatcher blocks which are designed to route the control flow of the instructions of the executable program between other blocks of the code that are performing the functional operations of the executable program. By analyzing the dispatcher blocks, as well as the execution state of the blocks of the code performing the functional operations, the order of execution of the executable program may be determined. The blocks of the code may then be reorganized to display the non-obfuscated execution flow of the executable program. In some embodiments, a malware analysis may be performed on the non-obfuscated control flow of the executable program.

The embodiments described herein provide improvements over some malware detection solutions which are unable to determine the non-obfuscated execution flow of an executable program. Embodiments of the present disclosure may be capable of identifying those portions of an executable program that are utilized primarily to affect the control flow of the executable program. By discounting and/or removing these portions from the analysis, embodiments of the present disclosure may be capable of focusing on the portions of the executable program that are performing functional operations, and may be able to identify the order that those functional operations are performed during execution. By deobfuscating the instructions of the executable program, a malware detection program may more accurately analyze the instructions and may be better able to identify an executable program as malware. In this way, embodiments according to the present disclosure may provide an improved capability of detecting malware and may increase the security of a computer system. In addition, embodiments of the present disclosure may improve the operation of a computer by removing and/or reducing malware, which can negatively impact the operation and/or functioning of the computer.

FIG. 1 is a block diagram that illustrates an example system 100 for deobfuscating an executable image 110, according to some embodiments of the present disclosure. FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

As illustrated in FIG. 1, the system 100 includes a computing device 120. The computing device 120 may include hardware such as processing device 122 (e.g., processors, central processing units (CPUs)), memory 124 (e.g., random access memory (RAM), storage devices 126 (e.g., hard-disk drive (HDD)), and solid-state drives (SSD), etc.), and other hardware devices (e.g., sound card, video card, etc.).

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as an application specific integrated circuit (ASIC), a field programmable gate array (FPGA), a digital signal processor (DSP), network processor, or the like.

Memory 124 may include volatile memory devices (e.g., random access memory (RAM)), non-volatile memory devices (e.g., flash memory) and/or other types of memory devices. In certain implementations, memory 124 may be non-uniform access (NUMA), such that memory access time depends on the memory location relative to processing device 122. In some embodiments, memory 124 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 124 may be configured for long-term storage of data and may retain data between power on/off cycles of the computing device 120.

A storage device 126 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Though illustrated as a separate element, in some embodiments, the storage device 126 may be mart of memory 124.

The computing device 120 may comprise any suitable type of computing device or machine that has a programmable processor including, for example, server computers, desktop computers, laptop computers, tablet computers, smartphones, set-top boxes, etc. In some examples, the computing device 120 may comprise a single machine or may include multiple interconnected machines (e.g., multiple servers configured in a cluster). The computing device 120 may be implemented by a common entity/organization or may be implemented by different entities/organizations.

The computing device 120 may have one or more executable images 110. In some embodiments, the executable images 110 contain one or more instruction codes 130 (also referred to herein as "computer instructions") configured to be executed by a computing device, such as the computing device 120 (e.g., by the processing device 122). In some embodiments, the instruction codes 130 may include computer instructions that are configured to be executed by a processing device 122 during execution of the executable image 110. For example, the instruction codes 130 may be configured to be loaded into memory 124 and executed as a process (e.g., by an operating system of the computing device 120).

In some embodiments, the instruction codes 130 may be or include assembly language and/or machine language that is to be executed by the processing device 122. In some embodiments, the instruction codes 130 may be compiled from a computer programming language. For example, computer source based on a particular computer programming language may be compiled by a compiler, which may generate assembly language and/or machine code as part of the instruction codes 130.

In some embodiments, the instruction codes 130 may be obfuscated. As used herein, obfuscated instruction code refers to a collection of instruction codes 130 whose structure and/or contents have been manipulated to obscure the function and/or operation of the instruction codes 130. For example, the instructions of the instruction codes 130 may be selected so as to make the true operation of the instruction codes 130 more difficult to detect and/or comprehend.

In some embodiments, the instruction codes 130 may be obfuscated code that has been manipulated to flatten a control flow of the instruction codes 130. A control flow of the instruction codes 130 refers to a path of execution of the instruction codes 130. For example, computer instruction codes 130 may be loaded into memory 124 and executed by processing device 122. In some embodiments, the execution of the instruction codes 130 by the processing device 122 may proceed serially through the instruction codes 130. That is to say that the processing device 122 may execute a first computer instruction at a first memory location and then subsequently execute a second computer instruction at an adjacent memory location.

Instruction codes 130 are not limited to serial execution, however. In some embodiments, the instruction codes 130 may include control transfer instructions. The control transfer instructions, which may be conditional or unconditional, may transfer control of the execution to instruction codes 130 at different locations. For example, an unconditional control transfer instruction may always transfer control to a different set of instruction codes 130 regardless of a state of the execution of the instruction codes 130. A conditional control transfer instruction may selectively transfer control to a different set of instruction codes 130 when certain conditions (e.g., a value of a register) are met, but may otherwise continue execution serially.

The control flow of an executable image 110, therefore, may refer to the path of execution through the instruction codes 130 of the executable image 110, including branches, either conditional or unconditional, that represent transfer of the control of the execution from one set of instruction codes 130 to another set of instruction codes 130.

Figure 2A:
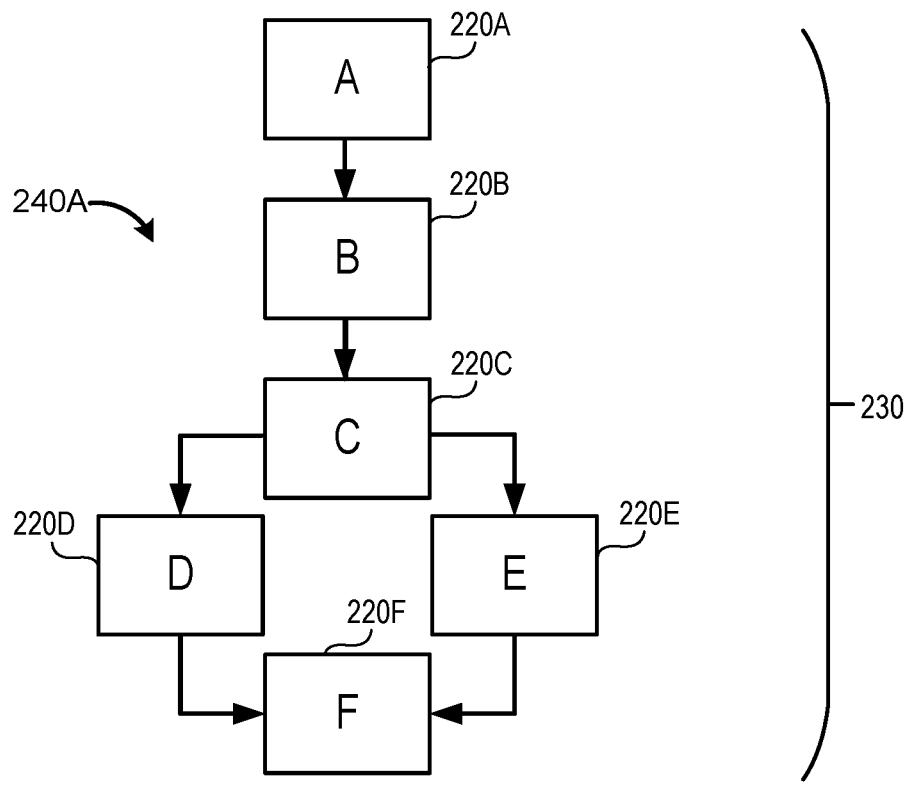
FIG. 2A is a schematic diagram of a control flow of a non-obfuscated set of computer instruction codes, in accordance with some embodiments of the present disclosure.
Figure 2B:
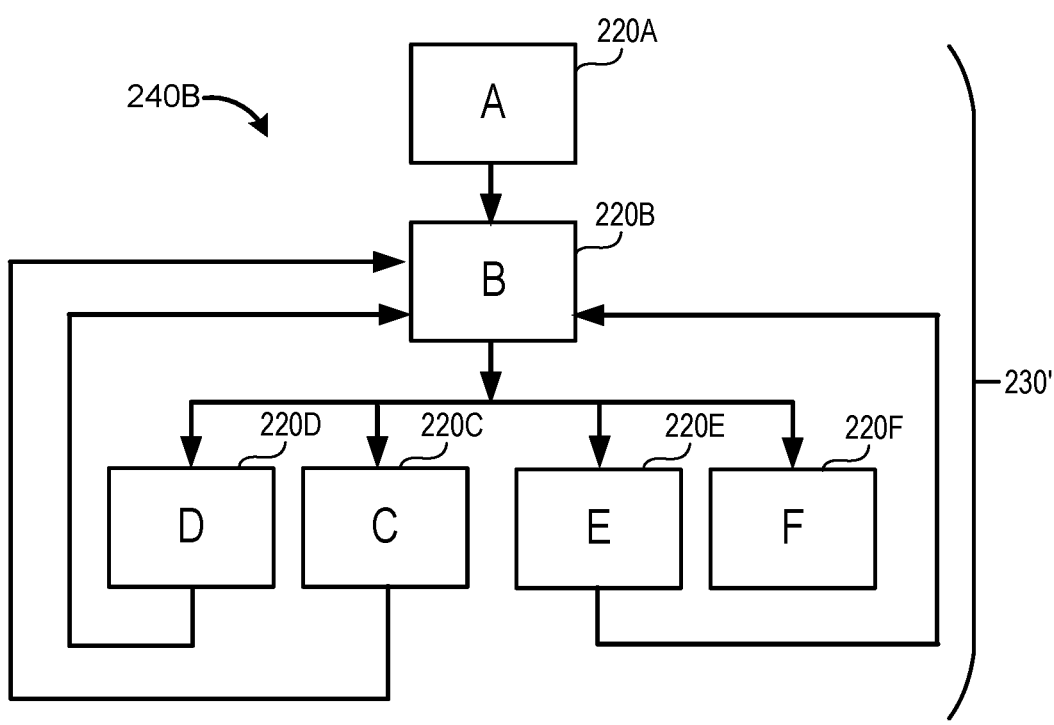
FIG. 2B is a schematic diagram illustrating an obfuscated control flow resulting from a control flow flattening operation on the computer instruction codes of FIG. 2A, in accordance with some embodiments of the present disclosure.

FIG. 2A is a schematic diagram of a control flow 240A of a non-obfuscated set of computer instruction codes 230, in accordance with some embodiments of the present disclosure. FIG. 2B is a schematic diagram illustrating an obfuscated control flow 240B resulting from a control flow flattening operation on the computer instruction codes 230 of FIG. 2A, in accordance with some embodiments of the present disclosure. The examples of FIGS. 2A and 2B are provided to explain concepts related to the embodiments of the present disclosure and are not intended to limit the embodiments.

Referring to FIG. 2A, the computer instruction codes 230 may include a plurality of instruction codes 230 arranged in one or more blocks 220. In FIG. 2A, six blocks 220 are illustrated, including block 220A, 220B, 220C, 220D, 220E and 220F. As illustrated in FIG. 2A, the blocks 220 of the instruction codes 230 may be configured in such a way to transfer control between the blocks 220 during execution of the instruction codes 230.

For example, referring to FIG. 2A, a first block 220A may include instruction codes (illustrated as "A") that execute and transfer control of the execution to a second block 220B. The second block 220B may include instruction codes (illustrated as "B") that execute and transfer control of the execution to a third block 220C.

The third block 220C may include instruction codes (illustrated as "C") that conditionally transfer code either to a fourth block 220D and its instruction codes (illustrated as "D") or to a fifth block 220E and its instruction codes (illustrated as "E"). After execution, both the fourth block 220D and the fifth block 220E may transfer control of execution to a sixth block 220F and its computer instructions (illustrated as "F").

The control flow 240A may refer to the execution path of an execution of the instruction codes 230 through the various blocks 220. In some embodiments, the control flow 240A may be determined either through analysis of the instruction codes 230 or through an execution (either simulated or monitored) of the instruction codes 230. The control flow 240A may provide helpful information in understanding the operation of the instruction codes 230. For example, by analyzing the control flow 240A, it may be determined when conditional branches are taken (such as illustrated with the third block 220C) and the analysis may determine which state registers of the computing device 120 are being analyzed to make the conditional change in control flow (e.g., either to the fourth block 220D or the fifth block 220E). Analysis of the control flow 240A may allow a malware detection engine to identify the function of the instruction codes 230 and, in some cases, identify the instruction codes 230 as malware.

In some embodiments, to avoid detection, malware may alter the instruction codes 230 to generate modified instruction codes 230'. The modified instruction codes 230' may include most, if not all, of the instruction codes 230, but may also include additional instructions that alter the control flow 240A to be an obfuscated control flow 240B.

For example, the same blocks 220A, 220B, 220C, 220D, 220E and 220F may be utilized, but an apparent control flow of the blocks 220 may be different. For example, as illustrated in FIG. 2B, a first block 220A may include instruction codes (illustrated as "A") that execute and transfer control of the execution to a second block 220B.

The second block 220B may include instruction codes (illustrated as "B") that execute and transfer control to one of a third block 220C, a fourth block 220D, a fifth block 220E, and a sixth block 220F. Each of the third through sixths blocks 220C-220E may unconditionally transfer control back to the second block 220B.

At first glance, the obfuscated control flow 240B may look much different from the control flow 240A. As a result, a malware analysis program may conclude that the original control flow 240A and the obfuscated control flow 240B are different. If the original control flow 240A was a control flow 240A that was associated with malware, it may be concluded that the obfuscated control flow 240B was not malware.

However, with relatively little additional code, the obfuscated control flow 240B may execute in a same control flow as the original control flow 240A. For example, the apparently conditional control transfer of the second block 220B may be performed by checking a dispatcher variable. Depending on the variable of the dispatcher variable, one of the third block 220C, the fourth block 220D, the fifth block 220E, or the sixth block 220F may be selected for execution by the second block 220B. As an example, the dispatcher variable may be set such that, at the conditional check in a first execution of the second block 220B, the third block 220C is chosen. The third block 220C may set the dispatcher variable for the second block 220B such that either the fourth block 220D or the fifth block 220E is selected when the third block 220C unconditionally transfers control to the second block 220B. Both the fourth block 220D and the fifth block 220E may set the dispatcher variable for the second block 220B such that the sixth block 220F is selected when the either the third or fourth block 220D, 220E unconditionally transfers control to the second block 220B.

Thus, by using a dispatcher variable, the obfuscated control flow 240B may perform a same function as the original control flow 240A, but may be difficult to analyze. For example, the obfuscated control flow 240B of FIG. 2B only has six blocks 220, but, in practice, an obfuscated control flow 240B may have hundreds or thousands of blocks 220, and the interaction of the control flow between the blocks 220 may be difficult to distinguish. Thus, by modifying the original control flow 240A to an obfuscated control flow 240B, a malware developer can potentially make their instructions codes 130 more difficult to identify and/or analyze.

Referring back to FIG. 1, the system 100 according to some embodiments of the present disclosure include a deobfuscation engine 115. The deobfuscation engine 115 may be configured to analyze a control flow 140 of the executable image 110 to generate a modified control flow 150. In some embodiments, the control flow 140 may be a flattened control flow 140, such as the obfuscated control flow 240B of FIG. 2B. In some embodiments, the modified control flow 150 may be similar to a non-obfuscated control flow 150, such as the control flow 240A of FIG. 2A.

As will be described in detail herein, the deobfuscation engine 115 may be configured to convert the control flow 140 into a modified control flow 150 in which a control flow flattening process that was performed on the instruction codes 130 is at least partially reversed. Thus, embodiments of the present disclosure may be capable of exposing executable images 110 that have modified their instruction codes 130 so as to make the modified control flow 150 of the instruction codes 130 more difficult to detect.

Figure 3:
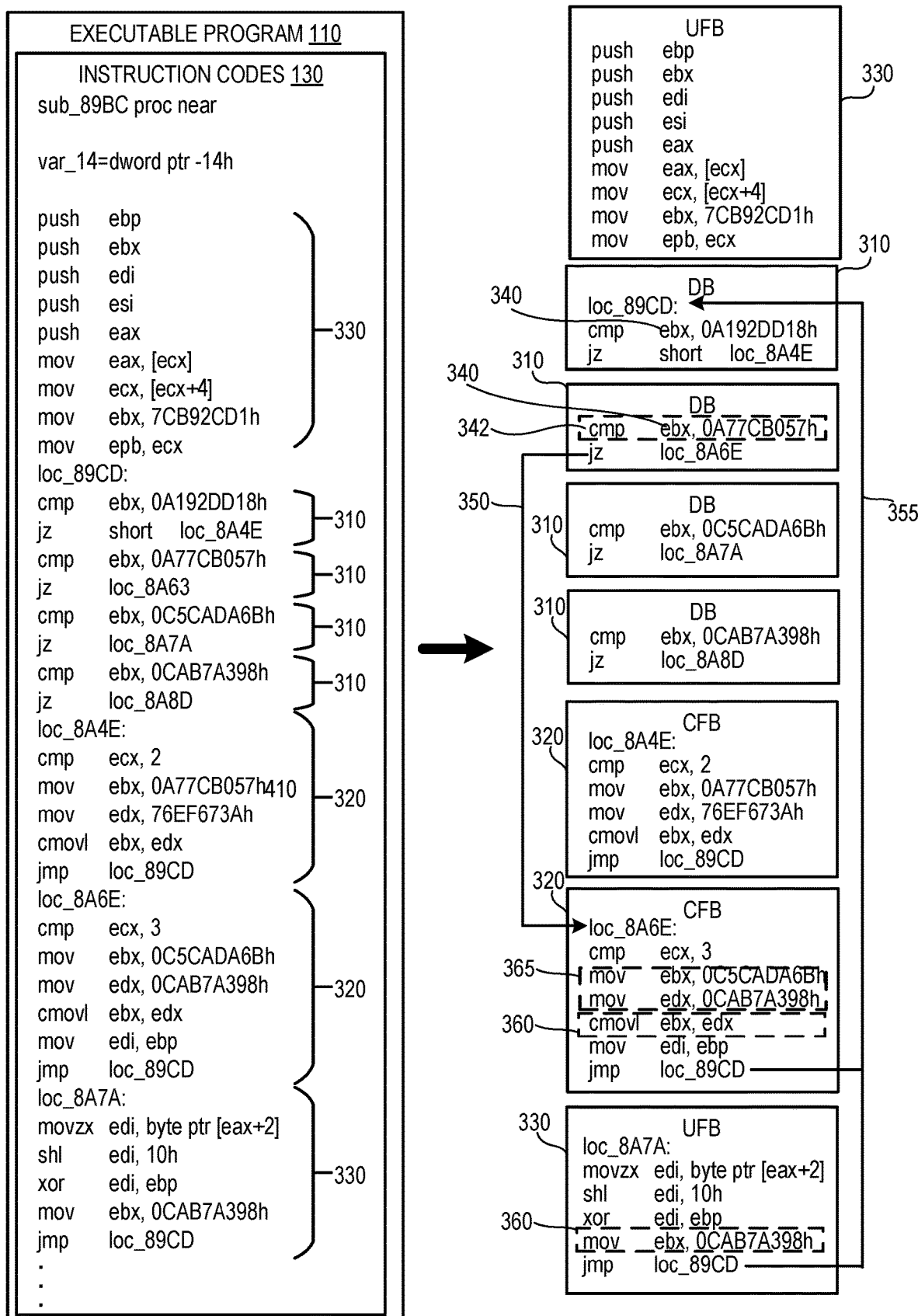
FIG. 3 is a schematic diagram illustrating a categorization of instruction codes of an executable image, in accordance with some embodiments of the present disclosure.

The deobfuscation engine 115 may be configured to analyze the instruction codes 130 of the executable image 110 to identify different categories of code blocks within the instruction codes 130. FIG. 3 is a schematic diagram illustrating a categorization of instruction codes 130 of an executable image 110, in accordance with some embodiments of the present disclosure. A description of elements of FIG. 3 that have been previously described will be omitted for brevity.

Referring to FIG. 3, the instruction codes 130 of the executable image 110 may include a number of individual computer instructions arranged serially. The assembly language illustrated in FIG. 3 is merely for the purpose of providing an example, and it will be understood that other types of computer instructions (e.g., instruction codes 130), including machine language and/or higher level languages, may be used without deviating from the embodiments of the present disclosure.

The instruction codes 130 may be analyzed to identify three types of code block. Though three types are illustrated with respect to FIG. 3, it will be understood that more or fewer types of blocks may be identified without deviating from the embodiments of the present disclosure. The three types of blocks may include a dispatcher block (DB) type 310, a conditional function block (CFB) type 320, and an unconditional function block (UFB) type 330.

A DB type block 310 may include a sequence of instruction codes 130 that are configured to compare 342 a value of a dispatcher variable 340 to one or more values (e.g., one or more constants) and transfer control 350 of the program to different locations based on the comparison 342. For example, the dispatcher variable 340 may be a register, and the comparison 342 performed by the DB type block 310 may compare the value of the register to one or more constants. In FIG. 3, as an example only, it is illustrated that four DB type blocks 310 are detected within the computer instructions 130.

An example of one of the DB type blocks 310 is as follows:

```
cmp      ebx, 0A77CB057h
jz       loc_8A63
```

In the example above, the dispatcher variable 340 is the register ebx, and a comparison 342 is made to the constant value "0A77CB057h." It will be understood that other registers and/or memory location could be utilized as the dispatcher variable 340, and the comparison 342 could be made to contents of other registers or memory locations, without deviating from the embodiments of the present disclosure.

In the example above, the DB type block 310 conditionally transfers 350 control to a location in memory (jz loc_8A63) based on the comparison 342 of the dispatcher variable 340 to the constant value. In some embodiments, the DB type block 310 may transfer control 350 to one of the CFB type blocks 320 or one of the UFB type blocks 330 based on the comparison 342 of the dispatcher variable 340.

The CFB type blocks 320 and the UFB type blocks 330 may execute some number of instruction codes 130 before directly transferring control 355 to one or more of the DB type blocks 310. For example, the CFB type blocks 320 and the UFB type blocks 330 may load and/or update 360 the dispatcher variable 340 (ebx in the example of FIG. 3) used by the DB type blocks 310 to define which block will be executed next.

The CFB type blocks 320 may differ from the UFB type blocks 330 in that the CFB type blocks 320 may conditionally load 365 the dispatcher variable 340 based on other logic or comparisons. Thus, upon exit of the CFB type blocks 320, a value of the dispatcher variable 340 may vary depending on operations performed by the CFB type block 320. In FIG. 3, two CFB type blocks 320 are identified. An example of a CFB type block 320 from FIG. 3 is:

```
loc_8A6E:
cmp      ecx, 3
mov      ebx, 0C5CADA6Bh
mov      edx, 0CAB7A398h
cmovl    ebx, edx
mov      edi, ebp
jmp      loc_89CD
```

In the example above, the CFB type block 320 places potential values for the dispatcher variable 340 into register ebx and edx, and then conditionally overwrites the contents of the ebx register (the dispatcher variable 340) based on an earlier register comparison. The code then transfers 355 control back to the dispatcher type blocks 310 (jmp loc_89CD).

The UFB type blocks 330 may unconditionally load 360 the dispatcher variable 340 so that, upon exit of the UFB type block 330, a value of the dispatcher variable 340 may be unconditionally set. In FIG. 3, two UFB type blocks 330 are identified. An example of a UFB type block 330 from FIG. 3 is:

```
loc_8A7A:
movzx edi, byte ptr [eax+2]
shl      edi, 10h
xor      edi, ebp
mov      ebx, 0CAB7A398h
jmp      loc_89CD
```

In the example above, the UFB type block 330 sets a constant value ("0CAB7A398h") for the dispatcher variable 340 and then transfers 355 control back to the dispatcher type blocks 310 (jmp loc_89CD).

In some embodiments, identifying the dispatcher variable 340 may be accomplished by emulating the instruction codes 130 of the DB type blocks 310, the CFB type blocks 320, and/or the UFB type blocks 330. Referring back to FIG. 1, in some embodiments, identifying the dispatcher variable 340 may be accomplished by sending the instruction codes 130 of the DB type blocks 310, the CFB type blocks 320, and/or the UFB type blocks 330 through an emulation engine 155.

In some embodiments, the emulation engine 155 may perform symbolic computation. Symbolic computation involves manipulating mathematical expressions or equations as symbolic entities, rather than performing numerical calculations on specific values. A symbolic engine of the emulation engine 155 may analyze the instruction codes 130 to determine what inputs cause each block of the instruction codes 130 to execute. An interpreter and/or emulator may follow the instruction codes 130, assuming symbolic values for inputs rather than obtaining actual inputs as would be the case with actual execution of the instruction codes 130. By using symbolic execution in some embodiments, it may be determined by the emulation engine 155 which input (e.g., which dispatcher variable 340) controls the execution of the dispatcher blocks 310. For example, the symbolic execution may determine that the instruction codes 130 of the dispatcher blocks 310 compare a particular variable (e.g., a particular register) before performing a transfer control to one of the UFB type blocks 330 and/or CFB type blocks 320. Based on the symbolic execution, it may be determined that this particular variable is the dispatcher variable 340.

The embodiments of the present disclosure are not limited to symbolic execution, however. In some embodiments, the emulation engine 155 may perform emulation of the instruction codes 130. For example, the instruction codes 130 of the UFB type blocks 330 may be emulated by the emulation engine 155 to identify the dispatcher variable 340 and its respective values for different UFB type blocks 330. In some embodiments, the instruction codes 130 of the CFB type blocks 320 may be emulated to identify the values for the dispatcher variable 340 that result from different conditional executions of the CFB type blocks 320. For example, the emulation may identify that different ones of the CFB type blocks 320 and/or UFB type blocks 330 modify the value of the dispatcher variable 340 and what value is used. By tracking the different values of the dispatcher variable 340 and/or the control transfers within the dispatcher blocks 310 based on the different values of the dispatcher variable 340, the emulation engine 155 (e.g., through symbolic execution and/or emulation) may determine the control flow through the CFB type blocks 320 and/or UFB type blocks 330 based on particular values of the dispatcher variable 340.

Once the instruction codes 130 of the executable image 110 are broken down into different categories of blocks (e.g., the DB type blocks 310, the CFB type blocks 320, and/or the UFB type blocks 330) the block types may be utilized to generate the modified control flow 150. For example, the knowledge of the control transfers between the various blocks, as well as knowledge of the dispatcher variable 340, may be utilized to rearrange and/or remove the blocks to form the modified control flow 150.

Figure 4:
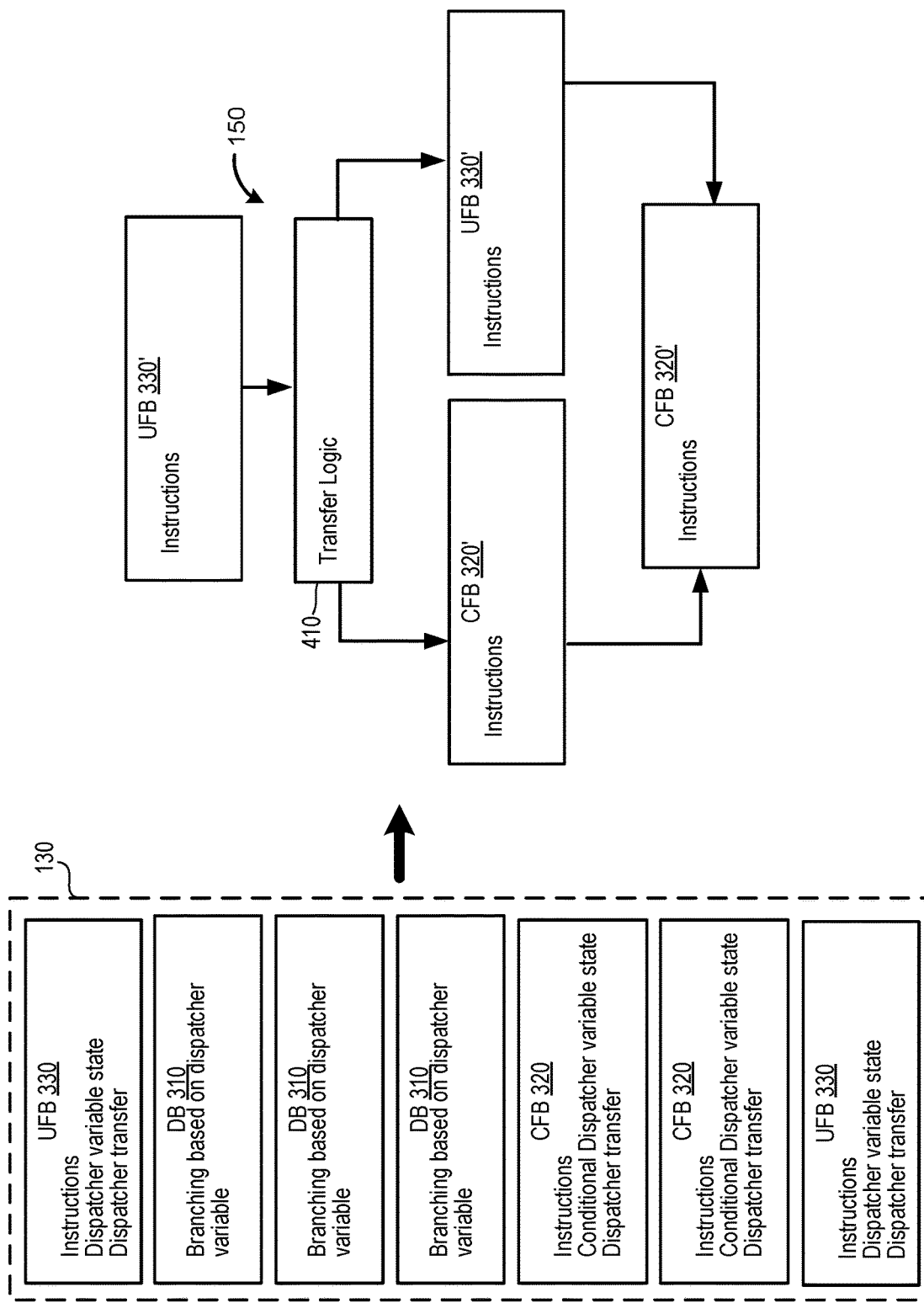
FIG. 4 is a schematic block diagram illustrating an expansion of an encoded function within an executable program, according to some embodiments of the present disclosure.

FIG. 4 is a schematic diagram illustrating the formation of the modified control flow 150, in accordance with some embodiments of the present disclosure. A description of elements of FIG. 4 that have been previously described will be omitted for brevity.

Referring to FIG. 4, the DB type blocks 310, the CFB type blocks 320 (a first CFB type block 320A and a second CFB type block 320B), and/or the UFB type blocks 330 of the instruction codes 130 may be analyzed to determine which portions of the DB type blocks 310, the CFB type blocks 320, and/or the UFB type blocks 330 are being utilized to obfuscate the control flow of the instruction codes 130.

For example, each of the DB type blocks 310, the CFB type blocks 320A, 320B, and/or the UFB type blocks 330 may be analyzed to determine which portions of the blocks are manipulating the dispatcher variable 340. In addition, the various control transfers (such as control transfer instructions 350, 355) as well as the state of the dispatcher variable 340 leading to those transfers may be analyzed. The analysis may determine which values of the dispatcher variable 340 are set by each of the CFB type blocks 320A, 320B and the UFB type blocks 330. The analysis may further determine which control flow through the DB type blocks 310, the CFB type blocks 320A, 320B, and/or the UFB type blocks 330 results from each state of the dispatcher variable 340.

For example, each DB type block 310 may be broken down into instructions that branch control of the execution of the instruction codes 130 based on a particular state of the dispatcher variable 340. Each UFB type block 330 may perform some number of instructions, set a state of the dispatcher variable 340, and transfer control back to one or more of the dispatcher type blocks 310. Each CFB type block 320A, 320B may perform some number of instructions, conditionally set a state of the dispatcher variable 340 based on those instructions, and transfer control back to one or more of the dispatcher type blocks 310.

By analyzing the state machine of the dispatcher variable and the values set by the CFB type blocks 320A, 320B and the UFB type blocks 330, the modified control flow 150 may be constructed. The modified control flow 150 may incorporate each of the CFB type blocks 320A, 320B and the UFB type blocks 330 as modified CFB type blocks 320A', 320B' and modified UFB type blocks 330'.

The modified UFB type blocks 330' may include the instructions of the UFB type blocks 330, but may have the logic related to setting the dispatcher register state and/or the dispatcher control flow transfer removed. Similarly, the modified CFB type blocks 320A', 320B' may include the instructions of the CFB type blocks 320A, 320B, respectively, but may have the logic related to conditionally setting the dispatcher register state and/or the dispatcher control flow transfer removed.

The modified UFB type blocks 330' and the modified CFB type blocks 320A', 320B' may be reorganized into the modified control flow 150. In some embodiments, the order of the modified UFB type blocks 330' and the modified CFB type blocks 320A', 320B' based on the state machine of the dispatcher variable 340 determined based on the analysis of the dispatcher type blocks 310. In some embodiments, additional logic, such as transfer logic 410, may be added to perform conditional transfers between code blocks (such as transferring control to a modified UFB type blocks 330' or to a modified CFB type blocks 320A', 320B') that were performed in the original instruction codes 130 through manipulations of the dispatcher variable 340.

The modified control flow 150 may be a deobfuscated version of the control flow 140 of the instruction codes 130. The modified control flow 150 may be easier to analyze to understand a function of the instruction codes 130 and/or the executable image 110. The operations performed by the deobfuscation engine 115 may greatly simplify the analysis of the control flow 140 of the executable image 110. By removing portions of the instruction codes 130 that were present primarily to obscure the operation of the instruction codes 130 and provide complex dispatching, the amount of the instruction codes 130 to be analyzed may be reduced. This may allow for a same analysis to utilize fewer computing resources while resulting in a more accurate outcome due to the removal of the obfuscation.

In some embodiments, the deobfuscation engine 115 may utilize a graph utility (which may be utilized to construct the control flow 140 and the modified control flow 150, executors (e.g., as part of emulation engine 155, which may include a symbolic engine), and/or code analysis utilities (e.g., to analyze the instruction codes of the various blocks).

As an example, the deobfuscation engine 115 may extract possible register(s) used by the instruction codes 130 to manipulate the dispatcher variable 340, and may extract load instructions 360 related to constant values (e.g., "mov" instructions), which may imply the dispatcher variable 340. The deobfuscation engine 115 may then extract and generate an internal representation of the control flow 140. From this information, the deobfuscation engine 115 may tag the different blocks in the three different categories based on an analysis of the instruction codes 130 and/or the dispatcher variable 340.

The deobfuscation engine 115 may also execute, through emulation engine 155, one or more of the types of blocks. For example, the emulation engine 155 may execute the DB type blocks 310, first. Next, the emulation engine 155 may execute the UFB type blocks 330 and then the CFB type blocks 320A, 320B. Information extracted from the different executions of the emulation engine 155 may be used to update the internal representation of the control flow 140.

Once each of the blocks is executed, the emulation engine 155 may perform additional phases to detect patterns within the control flow 140 and resolve issues related to the detection of the different types of the blocks. If the deobfuscation engine 115 is unable to categorize a particular block, it may be categorized in subsequent phases of emulation and/or marked as for later review by a user. In some embodiments, for example, a pattern that is not recognized in a first phase of analysis may be recognized once some of the blocks have been reorganized and executed. In this way, based on patterns spotted during analysis, it may be possible to categorize most and/or all of the different types of blocks.

Once all of the blocks have been explored and their information extracted the modified control flow 150 can be generated. Generating the modified control flow 150 may include linking the targets of the DB type blocks 310 with the constant(s) carried by the UFB/CFB type blocks 320, 330 into an intermediate structure. Once the intermediate structure is generated, instruction codes 130 may be stripped from all the instructions related to the DB type blocks 310. For example, unrelated load instructions related to the dispatcher variable 340 (e.g., "cmov" or "mov" instructions) may be removed. In some embodiments, for example, a "cmov" instruction may not be related to the dispatcher blocks, but the analysis of the various blocks may be capable of detecting this relationship. In addition, in some embodiments, all DB type blocks 310 may be removed from the modified control flow 150. In some embodiments, the modified control flow 150 may be further altered to convert and/or remove control transfer instructions 350, 355.

Referring back to FIG. 1, in some embodiments, the deobfuscation engine 115 may present the modified control flow 150 as a graphical representation, which may assist in its analysis. In some embodiments, the deobfuscation engine 115 may execute as a plugin executing on the computing device 120.

In some embodiments, the modified control flow 150 may be provided to a malware detection engine 160. The malware detection engine 160 may be configured to analyze the modified control flow 150 to determine if the modified control flow 150 is similar to known malware. In some embodiments, the malware detection engine 160 may be configured to perform remediation responsive to determining that the modified control flow 150 is similar to that of malware. Remediation may include, but is not limited to, deleting the executable image 110, quarantining the executable image 110 (e.g., setting access controls such that the executable image 110 may not be executed and/or accessed), stopping any executing processes that are associated with and/or loaded from the executable image 110, and/or transmitting alerts regarding the executable image 110.

Though the malware detection engine 160 is illustrated as being co-resident with the deobfuscation engine 115 on a same computing device 120, this is only for ease of description. In some embodiments, the deobfuscation engine 115 may be maintained separately from the malware detection engine 160. For example, the deobfuscation engine 115 may be configured to generate the modified control flow 150, which may be transmitted to a separate machine and/or computing device that may be configured to analyze the modified control flow 150 to determine if the modified control flow 150 is associated with malware.

Figure 5:
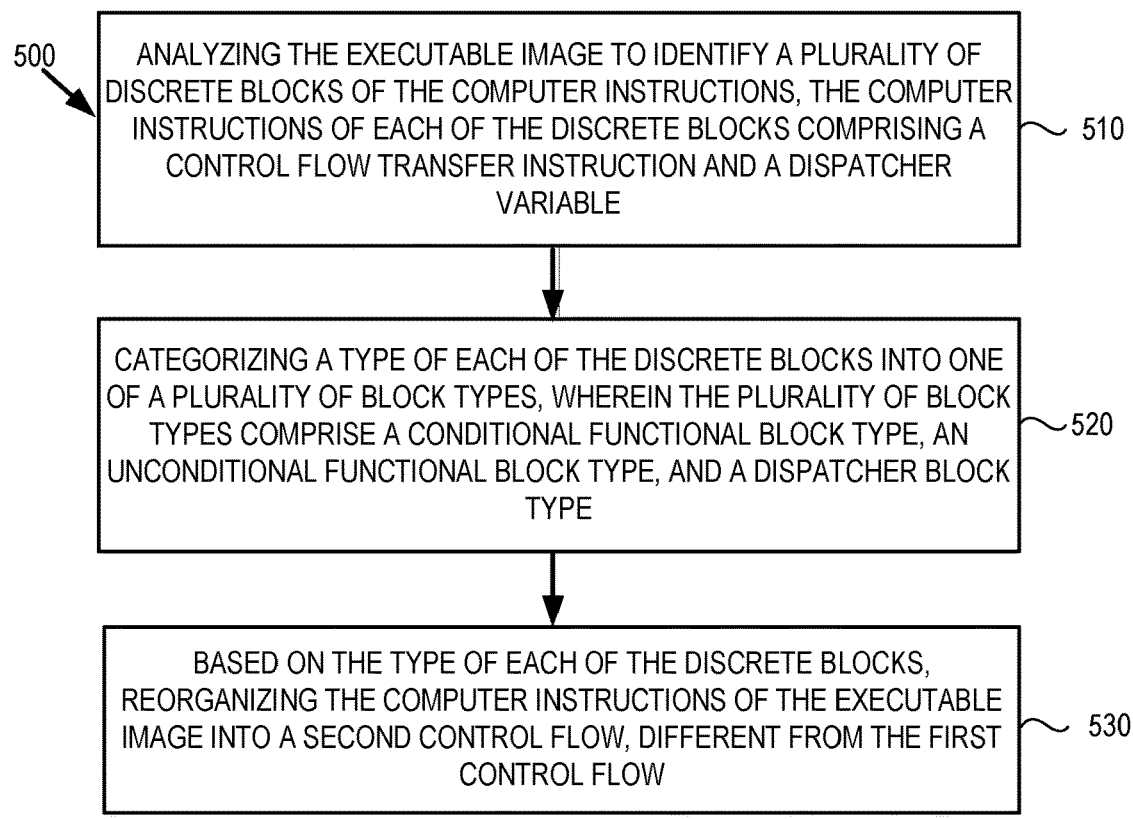
FIG. 5 is a flow diagram of a method of deobfuscating an executable image, according to some embodiments of the present disclosure.

FIG. 5 is a flow diagram of a method 500 of deobfuscating an executable image, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 120).

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Referring simultaneously to the prior figures as well, the method 500 begins at block 510, which includes analyzing an executable image to identify a plurality of discrete blocks of computer instructions, the computer instructions of each of the discrete blocks comprising a control flow transfer instruction and a dispatcher variable. In some embodiments, the computer instructions may be similar to instruction codes 130 described herein, and may have a first control flow similar to the control flow 140 described herein with respect to FIGS. 1 to 4. In some embodiments, the dispatcher variable may be similar to dispatcher variable 340 described herein with respect to FIGS. 1 to 4. In some embodiments, the control flow transfer instructions may be similar to control transfer instructions 350, 355, described herein with respect to FIG. 3.

In some embodiments, the method 500 may further include identifying the dispatcher variable by performing a symbolic execution of the computer instructions of at least one of the discrete blocks having the dispatcher block type. In some embodiments, the symbolic execution may be performed by an emulation engine such as emulation engine 155 described herein with respect to FIGS. 1 to 4.

At block 520, the method 500 may include categorizing a type of each of the discrete blocks into one of a plurality of block types. The plurality of block types may include a conditional functional block type, an unconditional functional block type, and a dispatcher block type. In some embodiments, the conditional functional block type, the unconditional functional block type, and the dispatcher block type may be similar to conditional functional block (CFB) type 320, the unconditional functional block (UFB) type 330, and a dispatcher block (DB) type 310, respectively, described herein with respect to FIGS. 1 to 4.

In some embodiments, the computer instructions of the discrete blocks having the conditional functional block type and the unconditional functional block type are configured to perform an update of the dispatcher variable and execute the control flow transfer instruction to transfer control to one of the discrete blocks having the dispatcher block type. In some embodiments, a first discrete block is categorized into the conditional functional block type or the unconditional functional block type based in part on whether the update of the dispatcher variable is conditional or unconditional.

At block 530, the method 500 may include, based on the type of each of the discrete blocks, reorganizing the computer instructions of the executable image into a second control flow, different from the first control flow. In some embodiments, the second control flow may be similar to the modified control flow described herein with respect to FIGS. 1 to 4. In some embodiments, the discrete blocks of the first control flow having the dispatcher block type are removed from the second control flow. In some embodiments, computer instructions of the first control flow associated with the dispatcher variable are removed from the second control flow.

In some embodiments, the method 500 may further include providing the second control flow to a malware detection engine. The malware detection engine may be configured to detect malware associated with the executable image based on the second control flow. In some embodiments, the malware detection engine may be similar to malware detection engine 160 described herein with respect to FIGS. 1 to 4.

Figure 6:
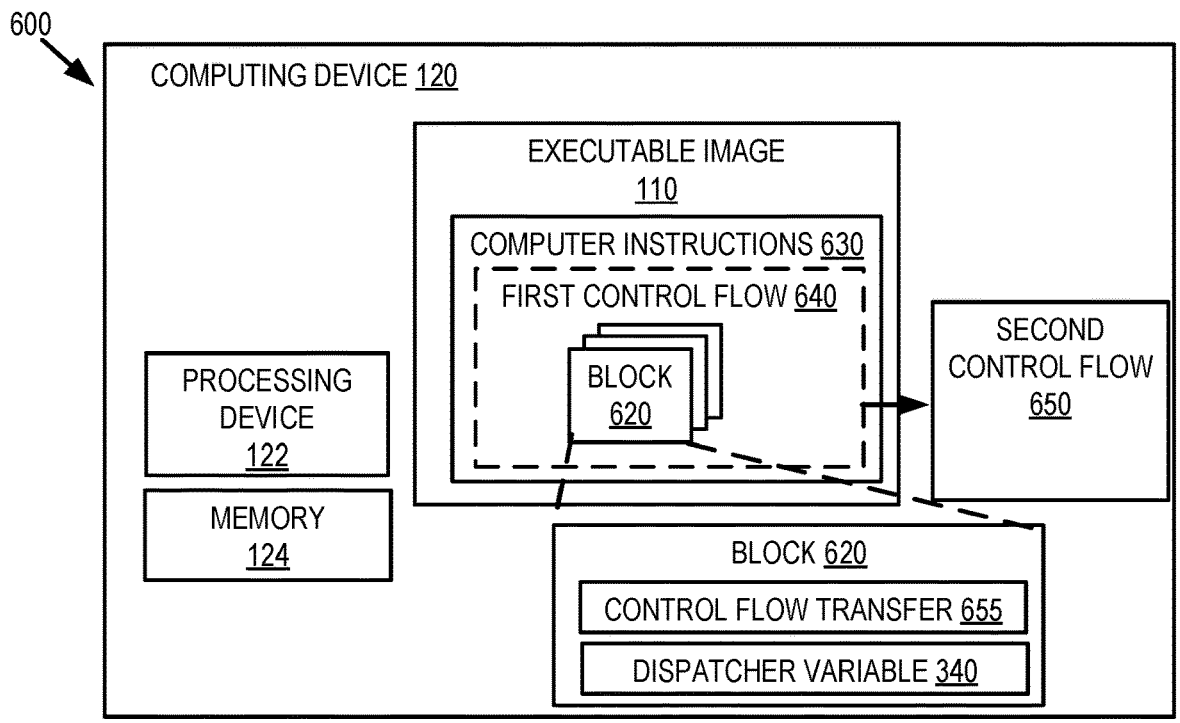
FIG. 6 is a component diagram of an example of a deobfuscation architecture, in accordance with embodiments of the disclosure.

FIG. 6 is a component diagram of an example of an obfuscation detection and/or remediation architecture 600, in accordance with embodiments of the disclosure. The device architecture 600 includes computing device 120 having processing device 122 and memory 124, as described herein with respect to FIGS. 1 to 5.

An executable image 110 including a plurality of computer instructions 630 organized in a first control flow 640 may be analyzed to identify a plurality of discrete blocks 620 of the computer instructions 630. In some embodiments, the executable image 110 may be similar to executable image 110 described herein with respect to FIGS. 1 to 5. In some embodiments, the plurality of computer instructions 630 may be similar to the instruction codes 130 described herein with respect to FIGS. 1 to 5. In some embodiments, the first control flow 640 may be similar to the control flow 140 described herein with respect to FIGS. 1 to 5.

Each of the computer instructions of each of the discrete blocks 620 may include a control flow transfer instruction 655 and a dispatcher variable 340. In some embodiments, the dispatcher variable 340 may be similar to dispatcher variable 340 described herein with respect to FIGS. 1 to 5. In some embodiments, the control flow transfer instruction 655 may be similar to control transfer instructions 350, 355, described herein with respect to FIG. 3.

The computing device 120 (e.g., through operation of processing device 122) may categorize a type of each of the discrete blocks 620 into one of a plurality of block types. The plurality of block types may include a conditional functional block type, an unconditional functional block type, and a dispatcher block type. In some embodiments, the conditional functional block type, the unconditional functional block type, and the dispatcher block type may be similar to conditional functional block (CFB) type 320, the unconditional functional block (UFB) type 330, and a dispatcher block (DB) type 310, respectively, described herein with respect to FIGS. 1 to 5.

Based on the type of each of the discrete blocks 620, the computing device 120 may reorganize the computer instructions 630 of the executable image 110 into a second control flow 650, different from the first control flow 640. In some embodiments, the second control flow may be similar to the modified control flow described herein with respect to FIGS. 1 to 5.

The device architecture 600 of FIG. 6 provides an improved capability for malware detection. The device architecture 600 allows for detection of control flow flattening in an executable image 110, and allows for an obfuscated control flow 640 to be reconfigured into a deobfuscated control flow 650 that may be, as an example, easier to analyze for malware detection purposes. By increasing a capability of malware detection, embodiments of the present disclosure improve the performance of the computing device 120 and reduce an amount of resources that may be needed to detect the malware.

Figure 7:
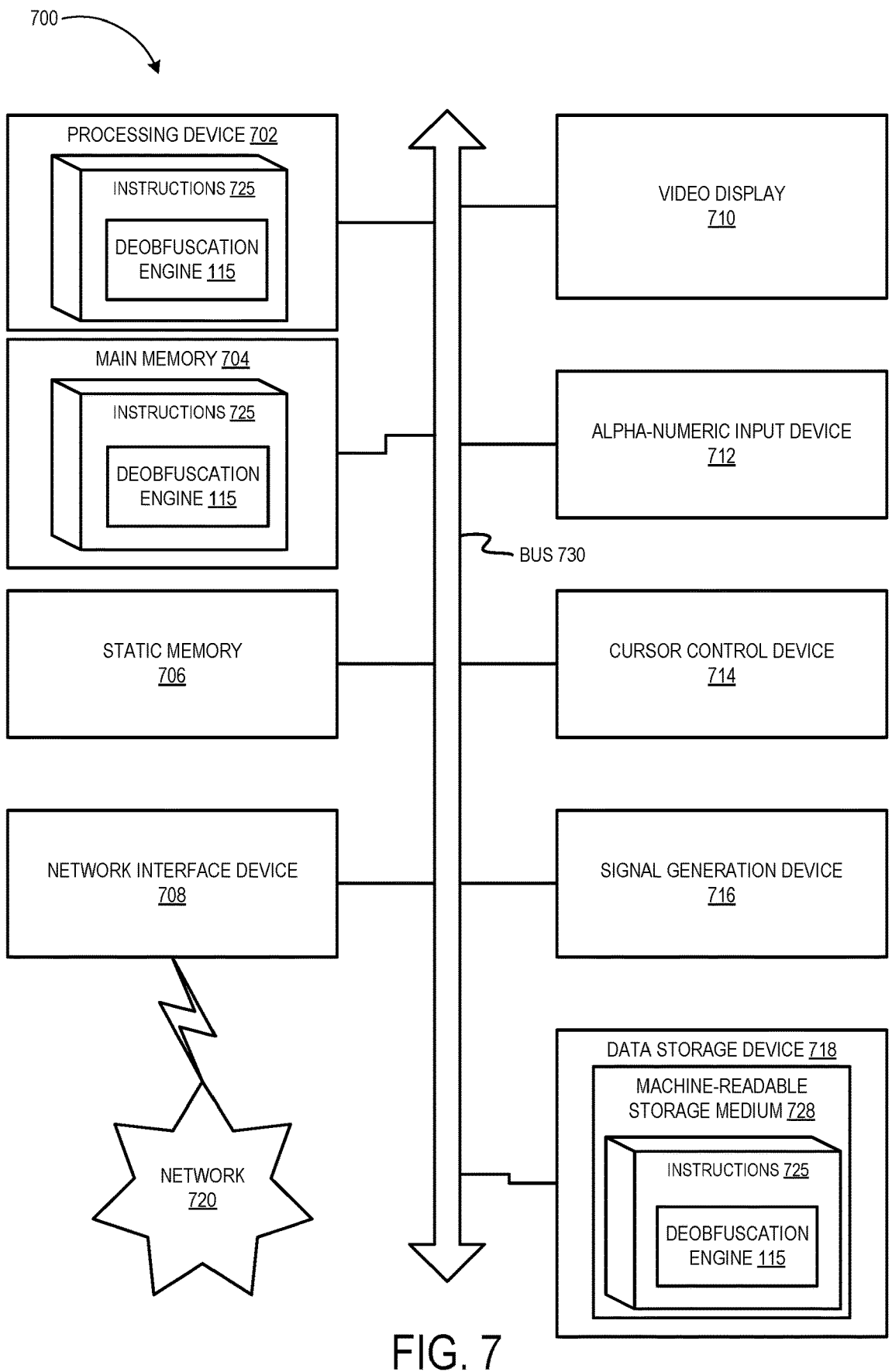
FIG. 7 is a block diagram of an example computing device that may perform one or more of the operations described herein, in accordance with embodiments of the disclosure.

FIG. 7 is a block diagram of an example computing device 700 that may perform one or more of the operations described herein, in accordance with some embodiments of the disclosure. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also include one or more special-purpose processing devices such as an application specific integrated circuit (ASIC), a field programmable gate array (FPGA), a digital signal processor (DSP), network processor, or the like. The processing device 702 may execute the operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions 725 that may include instructions for a deobfuscation engine 115 for carrying out the operations described herein, in accordance with one or more aspects of the present disclosure. Instructions 725 may also reside, completely or at least partially, within main memory 704 and/or within processing device 702 during execution thereof by computing device 700, main memory 704 and processing device 702 also constituting computer-readable media. The instructions 725 may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "analyzing," "categorizing," "reorganizing," "identifying," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A computer-implemented method of deobfuscating an executable image comprising a plurality of computer instructions organized in a first control flow, the method comprising:
analyzing the executable image to identify a plurality of discrete blocks of the computer instructions, the computer instructions of each of the discrete blocks comprising a control flow transfer instruction and a dispatcher variable;
categorizing, by a processing device, a type of each of the discrete blocks into one of a plurality of block types, wherein the plurality of block types comprise a conditional functional block type, an unconditional functional block type, and a dispatcher block type, and wherein the categorization of a first discrete block as the conditional functional block type or the unconditional functional block type is based at least in part on whether an update to the dispatcher variable in the first discrete block is conditional or unconditional; and
based on the type of each of the discrete blocks, reorganizing the computer instructions of the executable image into a second control flow, different from the first control flow.

2. The computer-implemented method of claim 1, further comprising identifying the dispatcher variable by performing a symbolic execution of the computer instructions of at least one of the discrete blocks having the dispatcher block type.

3. The computer-implemented method of claim 1, further comprising providing the second control flow to a malware detection engine, wherein the malware detection engine is configured to detect malware associated with the executable image based on the second control flow.

4. The computer-implemented method of claim 1, wherein the computer instructions of the discrete blocks having the conditional functional block type and the unconditional functional block type are configured to perform the update of the dispatcher variable and execute the control flow transfer instruction to transfer control to one of the discrete blocks having the dispatcher block type.

5. The computer-implemented method of claim 1, wherein the discrete blocks of the first control flow having the dispatcher block type are removed from the second control flow.

6. The computer-implemented method of claim 1, wherein computer instructions of the first control flow associated with the dispatcher variable are removed from the second control flow.

7. A system comprising:
a memory; and
a processing device, operatively coupled to the memory, to:
analyze an executable image comprising a plurality of computer instructions organized in a first control flow to identify a plurality of discrete blocks of the computer instructions, the computer instructions of each of the discrete blocks comprising a control flow transfer instruction and a dispatcher variable;
categorize a type of each of the discrete blocks into one of a plurality of block types, wherein the plurality of block types comprise a conditional functional block type, an unconditional functional block type, and a dispatcher block type, and wherein the categorization of a first discrete block as the conditional functional block type or the unconditional functional block type is based at least in part on whether an update to the dispatcher variable in the first discrete block is conditional or unconditional; and
based on the type of each of the discrete blocks, reorganize the computer instructions of the executable image into a second control flow, different from the first control flow.

8. The system of claim 7, wherein the processing device is further to identify the dispatcher variable by performing a symbolic execution of the computer instructions of at least one of the discrete blocks having the dispatcher block type.

9. The system of claim 7, wherein the processing device is further to provide the second control flow to a malware detection engine, wherein the malware detection engine is configured to detect malware associated with the executable image based on the second control flow.

10. The system of claim 7, wherein the computer instructions of the discrete blocks having the conditional functional block type and the unconditional functional block type are configured to perform the update of the dispatcher variable and execute the control flow transfer instruction to transfer control to one of the discrete blocks having the dispatcher block type.

11. The system of claim 7, wherein the discrete blocks of the first control flow having the dispatcher block type are removed from the second control flow.

12. The system of claim 7, wherein computer instructions of the first control flow associated with the dispatcher variable are removed from the second control flow.

13. A non-transitory computer-readable storage medium including instructions that, when executed by a processing device, cause the processing device to:
analyze an executable image comprising a plurality of computer instructions organized in a first control flow to identify a plurality of discrete blocks of the computer instructions, the computer instructions of each of the discrete blocks comprising a control flow transfer instruction and a dispatcher variable;
categorize a type of each of the discrete blocks into one of a plurality of block types, wherein the plurality of block types comprise a conditional functional block type, an unconditional functional block type, and a dispatcher block type, and wherein the categorization of a first discrete block as the conditional functional block type or the unconditional functional block type is based at least in part on whether an update to the dispatcher variable in the first discrete block is conditional or unconditional; and
based on the type of each of the discrete blocks, reorganize the computer instructions of the executable image into a second control flow, different from the first control flow.

14. The non-transitory computer-readable storage medium of claim 13, wherein the processing device is further to identify the dispatcher variable by performing a symbolic execution of the computer instructions of at least one of the discrete blocks having the dispatcher block type.

15. The non-transitory computer-readable storage medium of claim 13, wherein the processing device is further to provide the second control flow to a malware detection engine, wherein the malware detection engine is configured to detect malware associated with the executable image based on the second control flow.

16. The non-transitory computer-readable storage medium of claim 13, wherein the computer instructions of the discrete blocks having the conditional functional block type and the unconditional functional block type are configured to perform the update of the dispatcher variable and execute the control flow transfer instruction to transfer control to one of the discrete blocks having the dispatcher block type.

17. The non-transitory computer-readable storage medium of claim 13, wherein the discrete blocks of the first control flow having the dispatcher block type and computer instructions of the first control flow associated with the dispatcher variable are removed from the second control flow.

\* \* \* \* \*